(12) United States Patent
Birrell, Jr.

(10) Patent No.: US 6,470,027 B1
(45) Date of Patent: Oct. 22, 2002

(54) SYSTEM AND METHOD FOR PROVIDING MESSAGE REDIRECTION IN NETWORKED ENVIRONMENTS

(75) Inventor: John Mark Birrell, Jr., Lutz, FL (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/303,267

(22) Filed: Apr. 30, 1999

(51) Int. Cl.[7] ................................................. H04J 3/16
(52) U.S. Cl. ........................ 370/465; 370/310; 709/225
(58) Field of Search ................................ 370/465, 404, 370/310, 345, 346, 363, 392, 395.2; 709/225, 220, 219, 202, 238, 239, 201, 203, 226

(56) References Cited

U.S. PATENT DOCUMENTS

| | | | | |
|---|---|---|---|---|
| 5,941,954 A | * | 8/1999 | Kalajan | 709/239 |
| 6,144,671 A | * | 11/2000 | Peripanathan | 370/409 |
| 6,219,694 B1 | * | 4/2001 | Lazaridis | 370/338 |
| 6,247,054 B1 | * | 6/2001 | Malkin | 709/225 |
| 6,343,284 B1 | * | 1/2002 | Ishikawa | 705/67 |

* cited by examiner

*Primary Examiner*—Dang Ton
*Assistant Examiner*—Ricardo M. Pizarro

(57) ABSTRACT

The present invention provides a system and method for providing user notification of access violations, wherein packets are intercepted and a message returned to the user is redirected to a web page explaining why the user cannot access the host. This is currently implemented in TCP to redirect access violations from web browsers to hosts in the user's access list, which then display a message indicating why the user cannot access the desired host. This same model is also provided for the FTP and Telnet protocols.

14 Claims, 3 Drawing Sheets

| FIG. 2A |
| FIG. 2B |

SYSTEM AND METHOD FOR PROVIDING MESSAGE REDIRECTION IN NETWORKED ENVIRONMENTS

FIELD OF THE INVENTION

The invention relates to internet security and more particularly to software which provides, to a dial gateway, filtered router, or firewall, the ability to return a customizable text message or web page to a client user when an access violation occurs.

BACKGROUND OF THE INVENTION

Currently most security on the Internet, as well as along intranets, is provided by filtered routers or firewalls. These devices generally maintain a list of destinations with which a user is authorized to communicate, compare the addresses of user-generated packets to the addresses of the destinations of the list, and limit packets sent by the user based on the IP address and/or port to which the packets are addressed. If the user tries to access an IP address for which the user does not have authorization, the firewall or router typically either silently discards the packet or returns an ICMP "host unreachable" message to the client.

One problem is that many TCP stacks, including Microsoft win95*, winNT*, etc., do not look for the "host unreachable" message, and/or do not communicate the error messages to the user. In the best case scenario, where the stack does relay the message, it typically is a cryptic message which simply states that the host is unreachable. It does not give the user a reason why the host is unreachable. Since reasons why a "host unreachable" message may be generated include not only that the user is not authorized to access the host, but also that the host is down, or that there is not a route to the desired host, the user will not know whether to make another attempt at establishing the communication. In the case where the unreachable message is not processed properly, or where the router silently discards the offending packet, the user/client is forced to wait until the application times out, or until the client computer kills the application.

Another instance in which user-intended messages may be undeliverable, or undelivered, is when a user is conducting Internet searching on a "pay as you go" basis, wherein the user prepays an amount for a subscription representing a fixed amount of search time or a fixed number of search requests. When the user has exhausted his or her prepaid allotment, it is desirable that the user be informed, so that he or she may take immediate steps to resubscribe, without having to lose the benefit of their current search (i.e., without having to exit, resubscribe, and then search from the starting point, again).

What is desirable, therefore, and what is an object of the present invention, is to provide a system and method for appropriately directing network access messages for display to users.

Another object of the invention is to provide a user with instant knowledge when they have tried to access an improper host, with no need for waiting several minutes for the application to time out.

Yet another objective of the invention is to provide a returned message which can be customized to display helpful information, such as "You do not have access to host x.x.x.x. Please call Customer Support at 111-1111-1111 to have you access updated".

Still another objective of the invention is to facilitate implementation of a 'pay as you go' Internet service, wherein, when the user's time has expired, the user is redirected to a web page that allows the user to buy more Internet time and to continue surfing.

SUMMARY OF THE INVENTION

These and other objects are realized by the present invention wherein packets are intercepted and a message returned to the user is redirected to a web page explaining why the user cannot access the host. This is currently implemented in TCP to redirect access violations from web browsers to hosts in the user's access list, which then display a message indicating why the user cannot access the desired host. This same model can also be used in support of the FTP and Telnet protocols.

BRIEF DESCRIPTION OF THE DRAWINGS

The invention will now be described in greater detail with specific reference to the appended drawings wherein.

DETAILED DESCRIPTION OF THE INVENTION

In accordance with the present invention, a user is provided with instant knowledge when they have tried to access an improper host, without the need to wait several minutes for the application to time out. Furthermore, the returned message may be customized to display helpful information, such as "You do not have access to host x.x.x.x. Please call Customer Support at 111-1111-1111 to have you access updated". If the user tries to go outside of the listing of limited hosts, they are redirect to a web site that explains the limitations of their existing account, and lets them sign up for an unrestricted account, if appropriate and available. The web redirect service can also be used in a 'pay as you go' Internet service. The users buy Internet minutes, much like the prepaid phone cards, and when all of their time has expired, the user is automatically presented with a web page that allows the user to buy more Internet time and to continue surfing.

Figure 1:
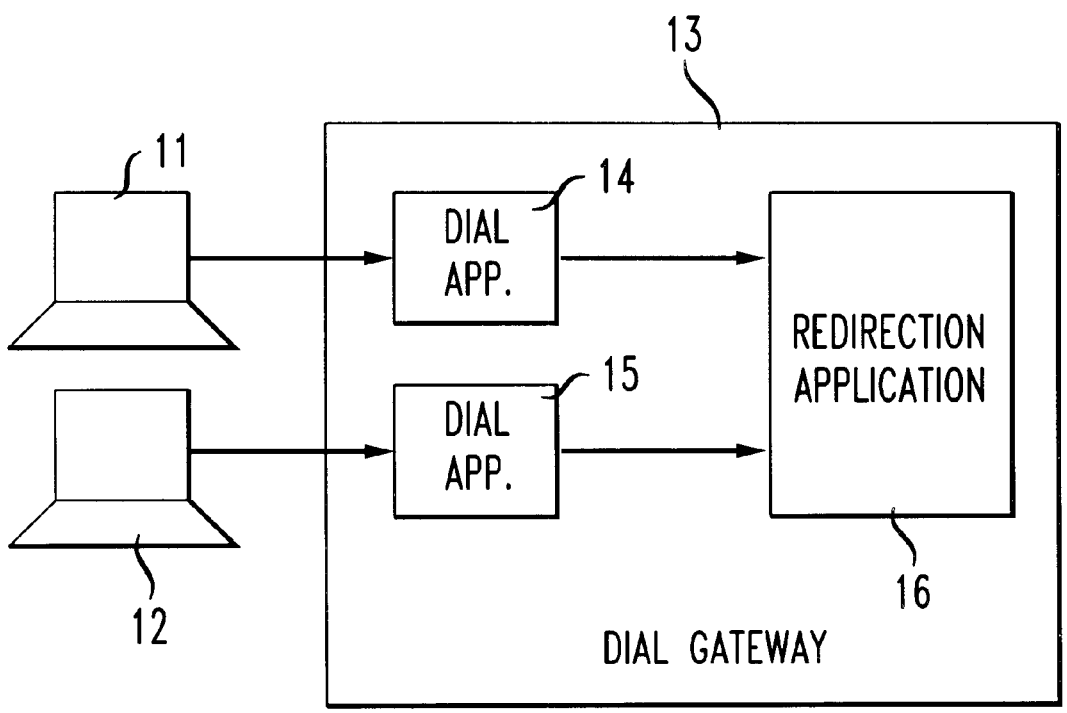
FIG. 1 provides a schematic representation of a network in which to implement the present invention, and FIG. 2 provides a flow chart of the process steps of the present invention.

FIG. 1 illustrates a representative network system in which the present invention can be readily implemented. Client locations, 11 and 12, receive user input and communicate requests to the dial gateway 13, which comprises at least one dial application, shown as 14 and 15. The dial applications direct the client messages through the redirection application 16 which effects the inventive redirection, so that the user at the client location is informed when an access violation occurs.

In accordance with one implementation of the invention, user access messages are redirected. As with the prior art, when a user authenticates, including signing on and providing a correct password, an access list is returned which determines which hosts the user is allowed to access. The access list is made up of IP address, and netmask pairs. Based on the netmask, the IP address can represent a single host or a number of hosts. For example: the IP address of 1.2.3.4 with a netmask of 255.255.255.255 represents a single host; while 1.2.3.0 with a netmask of 255.255.255.0 represents the 256 hosts 1.2.3.0 through 1.2.3.255. When the user generates a packet, the address of the packet is checked against the user's access list. If the IP destination address is in the user's access list, the packet is sent unmodified. (See 'Examples of Access List Processing' below for details). The foregoing process steps have been implemented in accordance with the teachings of U.S. patent application Ser. No. 09/270,378, filed Mar. 16, 1999, entitled "Method and System for Intelligent Address Translation in a Network Dial Connection" and assigned to the present assignee, the teachings of which are incorporated by reference herein. Other entities do the comparing, like filtered routers and firewalls. The compare determines that the packet is bad. The inventive process should focus on what is done with the packet once it's been determined that it's bad. If, however, the destination address is not in the user's table, then the packet is redirected. The redirection requires switching the packet's destination address, switching the TCP destination port, and recalculating the IP and TCP CRC values. In the current implementation of the redirection software, the application providing the client's dial access runs as a normal user application ( ie: not in the TCP stack at a kernel layer). To simplify the handling of the TCP protocol. the application simply performs a network address translation (NAT) on the client's packet. The NAT changes the IP packet's destination address to the IP address of the dial gateway's IP address and changes the TCP destination port value to the well known port on which the redirection application is listening. When the dial application sends the client modified IP packet, it will be received by the web redirection application. The web redirection application then goes through the TCP handshake of setting up the TCP socket, and accepts the 'GET/ HTTP' message from the browser. The redirect application then formats a 'HTTP/1.0 302 Moved Temporarily\r\nContent-Type: text/html\r\nLocation: www.redirectpage.com\r\n\r\n' message and sends it back to the client. The 'www.redirectpage.com' page can be any URL to which the client will be redirected. The dial application to which the client is connected then receives the packet from the redirect application and performs a NAT to restore the original destination address and port. The dial application then sends the modified IP packet back to the client. At this point, the client's browser receives the 'HTTP 302' message which causes the browser to automatically load the new URL.

Figures 2, 2A:
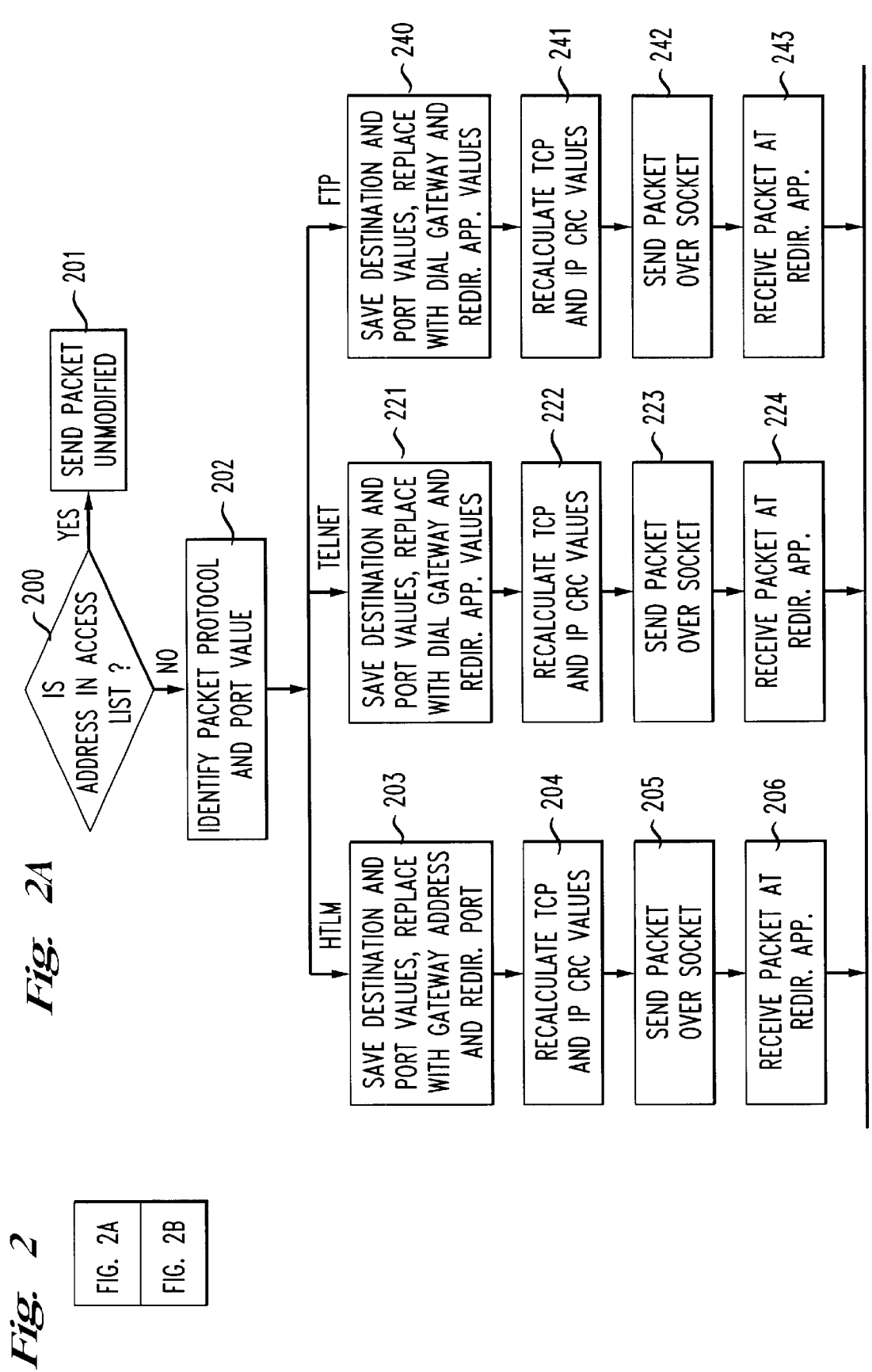
Figure 2B:
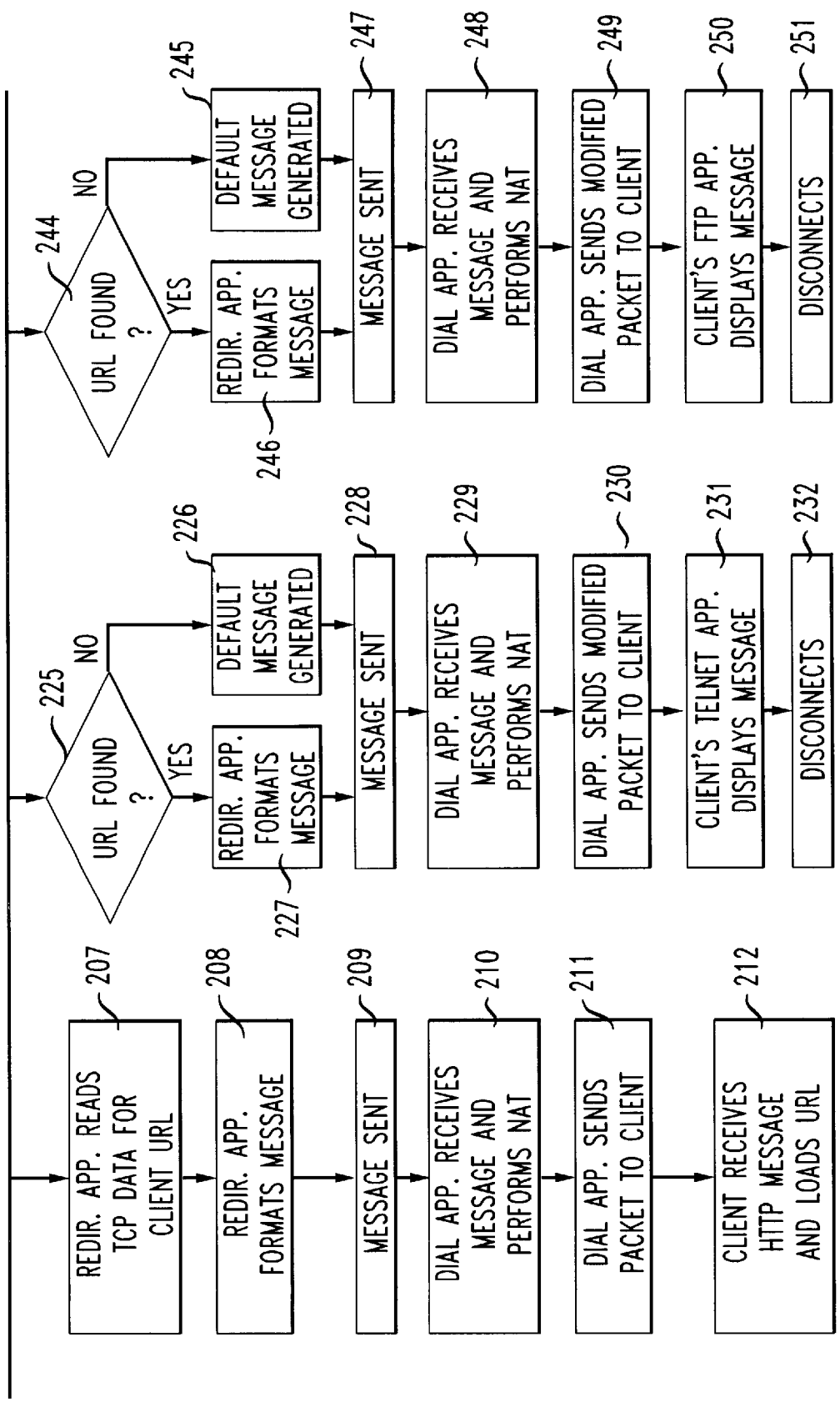

FIG. 2 illustrates process flows for the inventive redirection. To simplify the incoming IP packet processing, the redirection application listens on four sockets. Socket number 1 is used for control information. When the dial application authenticates the dial client, the authentication agent returns a URL and access violation message to be used in the event of an access violation. This control information, comprising the URL, message and the client's IP address, are sent from the dial application to the redirection application. The redirection application then stores this information in a table (not shown) indexed by the client's IP address. The three other sockets are used to support the three different redirected protocols. One socket is used for HTML, one for telnet and one for ftp. Clearly, fewer sockets need by included at the redirection application if only one protocol is anticipated. Similarly, should other protocols be implemented, additional sockets could be included.

FIG. 2 provides the process flow for handling packets. As detailed above, and in the aforementioned co-pending application, a determination is made by the dial application at the dial gateway as to whether the packet is addressed to a destination which is on the user's access list. If the determination, at step 200, is that the address is on the user's access list, then the packet is sent unmodified at 201. In the event that a dial client tries to send a packet to a destination which is not in the client's access list, as determined at step 200, the dial application will perform the following steps, as illustrated in FIG. 2. At step 202, the packet protocol and destination port values are ascertained from the packet. As an example, if the protocol is TCP and the destination port value is 80, then it is determined that the request is an HTML packet, presumably from a web browser. At step 203, original destination IP address is saved and the address in the packet is replaced with the IP address of the dial gateway. In addition, at step 203, the original TCP destination port is saved and is replaced with whatever known port is used by the redirection application. The port value for the redirection application is arbitrarily chosen; however, both the dial application and the redirection application are required to use the same value. The TCP and IP CRC values are then recalculated and inserted into the client's IP packet, at 204, followed by sending the modified client packet towards the network over an appropriate socket, at 205. Since the destination address in the modified packet belongs to the dial gateway, the TCP stack of the dial gateway routes the packet to the redirection application, where it is received at step 206. Based on the socket and destination port value, the redirection application ascertains that this is an HTML request. The redirection application reads the client TCP data, which is in the form of a standard HJML "GET HTTP" message from the browser, at step 207, and uses the source IP address of the TCP socket to search for the specific URL for the client. If the IP address is not found, the packet is discarded and redirection is not performed. If the client's redirection information is found, the redirect application then, at step 208, formats a "HTTP/1.0 302 Moved Temporarily\r\nContent-Type :text/html relocation :www.redirectpage.comr\n\r\n" message. The "www.redirectpage.com" page can be any URL to which the client will be redirected. The redirection application then sends the message back to the client over the TCP socket, at step 209. Once the message has been sent, the socket will be closed. The dial application to which the client is connected receives the packet from the redirection application and performs a network address translation to restore the original destination and port, at 210. Finally, the dial application then sends the modified IP packet back to the client, at 211. The client's browser receives the "HTTP 302" message with the packet, causing the browser to automatically load the new URL of the web site at which the message is displayed, at 212. If the packet is a telnet packet, as determined at step 202, wherein the protocol is TCP and the destination port is 23, the redirection steps include steps 220–232. At step 221, original destination IP address is saved and the address in the packet is replaced with the IP address of the dial gateway. In addition, at step 221 the original TCP destination port is saved and is replaced with whatever known telnet used by the redirection application. The port value for the redierection application is arbitrarily chosen; however, both the dial application and the redirection application are required to use the same value. The TCP and IP CRC values are then recalculated and inserted into the client's IP packet, at 222, followed by sending the modified client packet towards the network over an appropriate socket, at 223.

Since the destination address in the modified packet belongs to the dial gateway, the TCP stack of the dial gateway routes the packet to the redirection application, where it is received at step 224. The redirection application reads the client TCP data, at step 225, and determines if it can use the source IP address of the TCP socket to find the specific message for the client. If the IP address is not found, a default message is used, at 226. Alternatively, the redirect application, at step 227, formats a message such as "r\n\r\nYou have tried to access a host which you are not authorized for. To gain access to this host please contact your account administrator at 1-800-111-1111.r\n". The content of the returned message is arbitrary and can be customized based upon the wishes of the customer. The redirection application then sends the message back to the client over the TCP socket, at step 228. Once the message has been sent, the socket will be closed.

The dial application to which the client is connected receives the packet from the redirection application and performs a network address translation to restore the original destination and port, at 229. Finally, the dial application then sends the modified IP packet back to the client, at 230. The client's telnet application receives the packet, displays the message at 231, and disconnects at 232.

If it is determined at 202 that the protocol is TCP and the port value is 21, then the packet is an FTP packet and will be handled according to steps 240–251. At step 240, original destination IP address is saved and the address in the packet is replaced with the IP address of the dial gateway. In addition, at step 240, the original TCP destination port is saved and is replaced with whatever known telnet used by the redirection application. The port value for the redierection application is arbitrarily chosen; however, both the dial application and the redirection application are required to use the same value. The TCP and IP CRC values are then recalculated and inserted into the client's IP packet, at 241, followed by sending the modified client packet towards the network over an appropriate socket, at 242.

Since the destination address in the modified packet belongs to the dial gateway, the TCP stack of the dial gateway routes the packet to the redirection application, where it is received at step 243. The redirection application reads the client TCP data, at step 244, and determines if it can use the source IP address of the TCP socket to find the specific message for the client. If the IP address is not found, a default message is used, at 245. Alternatively, the redirect application, at step 246, formats a message such as "530-r\n530- r\n530- You have tried to access a host which you are not authorized for. To gain access to this host please contact your account administrator at 1-800-111-1111.r\n530 r\n". As above, the content of the message can be customized. The redirection application then sends the message back to the client over the TCP socket, at step 228. Once the message has been sent, the socket will be closed.

The dial application to which the client is connected receives the packet from the redirection application and performs a network address translation to restore the original destination and port, at 248. Finally, the dial application then sends the modified IP packet back to the client, at 249. The client's ftp application receives the packet, displays the message at 250, and disconnects at 251.

Examples of Access List Processing

| Success | | | | | |
|---|---|---|---|---|---|
| Destination | 9.14.1.100 | | | | |
| Access List | 9.0.0.0 | | | | |
| Mask | 255.0.0.0 | | | | |
| 9.14.1.100 in binary | 0000 1001 | 0000 1110 | 0000 0001 | 0110 0100 | |
| 255.0.0.0 in binary | 1111 1111 | 0000 0000 | 0000 0000 | 0000 0000 | |
| result of "and" | 0000 1001 | 0000 0000 | 0000 0000 | 0000 0000 | |
| 9.0.0.0 in binary | 0000 1001 | 0000 0000 | 0000 0000 | 0000 0000 | |

| Success -continued | | | | |
|---|---|---|---|---|
| 255.0.0.0 in binary | 1111 1111 | 0000 0000 | 0000 0000 | 0000 0000 |
| result of "and" | 0000 1001 | 0000 0000 | 0000 0000 | 0000 0000 | since the two "and" results are equal, the packet is allowed to pass

| Failure | | | | |
|---|---|---|---|---|
| Destination | 9.14.1.100 | | | |
| Access List | 129.36.0.0 | | | |
| Mask | 255.255.0.0 | | | |
| 914.1.100 in binary | 0000 1001 | 0000 1110 | 0000 0001 | 0110 0100 |
| 255.255.0.0 in binary | 1111 1111 | 1111 1111 | 0000 0000 | 0000 0000 |
| result of "and" | 0000 1001 | 0000 1110 | 0000 0000 | 0000 0000 |
| 129.36.0.0 in binary | 1000 0001 | 0010 0100 | 0000 0000 | 0000 0000 |
| 255.255.0.0 in binary | 1111 1111 | 1111 1111 | 0000 0000 | 0000 0000 |
| result of "and" | 1000 0001 | 0010 0100 | 0000 0000 | 0000 0000 | since the two "and" results are not equal, the packet is discarded.

The invention has been described with specific reference to a preferred embodiment of the invention. Such modifications as may occur to one having ordinary skill in the art are understood to be within the spirit and scope of the invention as set forth in the appended claims.

Having thus described our invention, what we claim is as follows:

1. A method for providing user notification of the status of a packet having a destination address for transmission over a network from a user location to said destination address comprising the steps of:
   receiving said packet at a first application at a dial gateway;
   ascertaining packet status;
   modifying said packet into a modified packet;
   redirecting said modified packet to a second application at said dial gateway by replacing said destination address with an address of said dial gateway and retransmitting said packet from said first application onto said network;
   formatting a message to said user by determining a protocol for said packet and formatting said message based upon said protocol; and
   delivering said message with said modified packet from said second application to said user at said user location.

2. The method of claim 1 wherein said formatting of said message comprises the step of retrieving a default message.

3. The method of claim 1 further comprising the steps of:
   receiving said modified packet at said user location; and
   displaying said message at said user location.

4. The method of claim 1 further comprising the steps of:
   receiving said modified packet at said user location;
   loading an URL in said modified packet at said user location.

5. The method of claim 1 wherein said ascertaining said packet status comprises determining whether said user has access to said destination address.

6. The method of claim 5 wherein said first application maintains a user access list and wherein said determining comprises comparing said destination address to said access list.

7. The method of claim 1 wherein said ascertaining said packet status comprises determining whether said user has network access.

8. The method of claim 7 wherein said first application maintains a user account list comprising a counter for increments of prepaid network usage and wherein said determining comprises determining if said user has expended all prepaid increments.

9. A system for providing for user notification of the status of a packet having a destination address for transmission over a network from a user location to said destination address comprising:

a first application at a dial gateway adapted to receive said packet from said user location, to ascertain the status of the packet, and to modify said packet into a modified packet, wherein said first application additionally comprises an addressing component for replacing said destination address with an address of said dial gateway and transmitting means for retransmitting said packet from said first application onto said network; and a second application at said dial gateway adapted to receive said modified packet from said first application, to format a message to said user; and to deliver said message with said modified packet to said user at said user location, wherein said second application comprises a component for determining a protocol for said packet and for formatting said message based upon said protocol.

10. The system of claim 9 wherein said dial gateway includes at least one storage location.

11. The system of claim 9 wherein said dial gateway includes at least one storage location and wherein component for formatting said message is adapted to retrieve at least one default message from said at least one storage location.

12. The system of claim 10 wherein said first application comprises at least one component for comparing said destination packet address with a user access list stored at said at least one storage location.

13. A program storage device readable by machine, tangibly embodying a program of instructions executable by the machine to perform method steps for providing user notification of the status of a packet having a destination address for transmission over a network from a user location to said destination address, said method steps comprising:

receiving said packet at a first application at a dial gateway;

ascertaining packet status;

modifying said packet into a modified packet;

redirecting said modified packet to a second application at said dial gateway by replacing said destination address with the address of said dial gateway and retransmitting said packet from said first application onto said network;

formatting a message to said user by determining the protocol for said packet and formatting said message based upon said protocol; and delivering said message with said modified packet from said second application at said dial gateway to said user at said user location.

14. A method for providing user notification of the status of a packet having a destination address for transmission over a network from a user location to said destination address comprising the steps of:

receiving said packet at a first application at a dial gateway;

ascertaining packet status;

modifying said packet into a modified packet;

redirecting said modified packet to a second application at said dial gateway by replacing said destination address with an address of said dial gateway and retransmitting said packet from said first application onto said network;

formatting a message to said user by determining a protocol for said packet and formatting said message based upon said protocol;

delivering said message with said modified packet from said second application to said user at said user location;

receiving said modified packet at said user location; and loading an URL in said modified packet at said user location.

* * * * *